United States Patent
Watanabe et al.

(10) Patent No.: US 6,770,728 B2
(45) Date of Patent: Aug. 3, 2004

(54) PROCESS FOR PREPARING OCULAR LENS WITH URETHANE COMPOUND AND PROCESS FOR PREPARING URETHANE COMPOUND FOR MEDICAL INSTRUMENTS

(75) Inventors: Tsuyoshi Watanabe, Kasugai (JP); Eri Ito, Kasugai (JP); Sadayasu Tanikawa, Kasugai (JP); Shoji Ichinohe, Gunma-ken (JP); Toshio Yamazaki, Gunam-ken (JP); Mouad Lamrani, Kasugai (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 10/284,112

(22) Filed: Oct. 31, 2002

(65) Prior Publication Data

US 2003/0125500 A1 Jul. 3, 2003

Related U.S. Application Data

(63) Continuation-in-part of application No. 09/608,004, filed on Jun. 30, 2000, now Pat. No. 6,495,651.

(30) Foreign Application Priority Data

Jun. 30, 1999 (JP) .......................................... 11-185023

(51) Int. Cl.$^7$ ................................................ C08G 18/22
(52) U.S. Cl. ........................ 528/54; 522/91; 523/107; 528/28; 528/49; 528/69; 528/71
(58) Field of Search .............................. 528/28, 54, 49, 528/69, 71; 522/91; 523/107

(56) References Cited

U.S. PATENT DOCUMENTS

| | | | |
|---|---|---|---|
| 4,543,398 A | * | 9/1985 | Bany et al. |
| 4,886,866 A | | 12/1989 | Braatz et al. |
| 4,933,408 A | | 6/1990 | Goldenberg |
| 5,070,169 A | | 12/1991 | Robertson et al. |
| 5,733,945 A | | 3/1998 | Simpson |

* cited by examiner

*Primary Examiner*—Rachel Gorr
(74) *Attorney, Agent, or Firm*—Armstrong, Kratz, Quintos, Hanson & Brooks, LLP

(57) ABSTRACT

A process for preparing an ocular lens with a urethane compound comprising the steps of
a) preparing a urethane compound by reacting at least one hydroxyl compound and at least one isocyanate compound in the presence of an organic iron compound,
b) removing the organic iron compound from the urethane compound obtained in the step a)
c) mixing the urethane compound obtained in the step b) with at least one compound selected from the group consisting of another copolymerizable compound, a crosslinking agent, a UV absorbent, a dye, a polymerization initiator, a photosensitizer, and an organic solvent to obtain a mixture, and
d) curing the mixture obtained in the step c) to prepare a lens.

10 Claims, No Drawings

PROCESS FOR PREPARING OCULAR LENS WITH URETHANE COMPOUND AND PROCESS FOR PREPARING URETHANE COMPOUND FOR MEDICAL INSTRUMENTS

CROSS-REFERENCE TO RELATED APPLICATIONS

This is a continuation-in-part of application Ser. No. 09/608,004 filed on Jun. 30, 2000, now U.S. Pat. No. 6,495,651.

BACKGROUND OF THE INVENTION

The present invention relates to a process for preparing an ocular lens with urethane compound and a process for preparing a urethane compound for medical instruments. More particularly, the present invention relates to a process for easily preparing a urethane compound (macromonomer) showing high safety, which is very useful for a material of medical instruments represented by optical materials, for example, an ocular lens such as a contact lens and an intraocular lens, artificial cornea, cornea onlay, cornea inlay. Furthermore, the present invention relates to a process for preparing a urethane compound while molecular weight of the compound is controlled.

At present, various urethane compounds such as urethane foam, urethane rubber, adhesives and polyurethane synthetic fiber are industrially used. Urethane compounds are used for medical instruments such as gloves, various kinds of tubes and catheters, and investigated to be applied for an artificial cornea (Japanese Unexamined Patent Publication No. 325369/2000), an artificial heart, and the like.

In absence of a catalyst or in the presence of a compound such as an organic metal compound or a tertiary amine, hydroxyl group is reacted with isocyanate group to form urethane bond. Particularly, from the viewpoint of high catalytic activity, the organic metal compounds are generally used. Among them, an organic tin compound is well known. For example, an ocular lens is reported which is made of a polyurethane compound prepared by using an organic tin compound as a catalyst (U.S. Pat. No. 4,605,712 and the like).

However, it is considered that the organic tin compound which is generally known as a compound showing high toxicity must not be used as a catalyst for preparation of urethane materials when the urethane materials are applied for medical instruments, such as an ocular lens, which are used in living organism or by contacting with living organism. The organic tin compound is recognized as a distraction substance for endocrine (environmental hormone) which is recently topical substance. Accordingly, some catalysts other than organic tin compounds are earnestly necessitated.

From the viewpoint of mechanical strength and excellent oxygen permeability, urethane compounds containing siloxane structure have been examined for the use as medical instruments, in particular, optical materials such as a contact lens material and an intraocular lens material (Japanese Unexamined Patent Publication No. 22487/1979, Japanese Unexamined Patent Publication No. 121826/1994, U.S. Pat. Nos. 5,451,617, 5,260,000, 5,760,100 and the like). However, because the urethane compounds disclosed in these references are prepared by using the organic tin compounds almost, these urethane compounds are not suitable as medical materials on the basis of the above reasons. Even if purification of the urethane compound is carried out, the organic tin compounds remain within the urethane compound.

Usually, the above urethane compounds containing siloxane structure (macromonomers) have been prepared by finally introducing a polymerizing group in a polyfunctional polysiloxane which is a main chain through urethane bond (Japanese Unexamined Patent Publication No. 179217/1986, Japanese Unexamined Patent Publication No. 35014/1991 and the like). However, when this method is employed, it is inevitable that the polymerizing group is inestimably and repeatedly introduced in the polyfunctional polysiloxane which is a main chain through urethane bond. As a result, molecular weight of the obtained urethane compound becomes higher than planned molecular weight. Accordingly, there is a problem that clear understanding for structure of the obtained compound is difficult.

Because the above urethane compound containing siloxane structure becomes high viscous solution according to its molecular weight or kind of reaction components, effective purification methods for the urethane compound are not developed. So, it is very difficult to remove impurities such as the above catalyst and by-products, and crude urethane compound is used. Accordingly, the use of the urethane compounds has been feared from the viewpoint of safety, including the above problems.

Use of an amine catalyst instead of the organic tin compound for preparing a urethane compound for a medical material is reported (U.S. Pat. No. 4,136,250). However, they are well known generally that specific amine catalysts have cytotoxicity (U.S. Pat. No. 5,955,560), and that amine catalysts are inferior to organic metal compounds in catalytic activity for reaction forming urethane bond and therefore requiring a long time for preparing a urethane compound and increasing a formation ratio of by-products.

Therefore, various organic metal compounds have been investigated as a reaction catalyst for forming urethane bond, because they have a high reaction activity for forming urethane bond, and a low cytotoxicity.

For example, using an acetylacetonate salt of metal such as zinc, iron, or copper is reported for urethane reaction (U.S. Pat. No. 4,879,032, Polymer preprints, Japan, 50, 1258, 2001). However, safety such as cytotoxicity is not evaluated. There are not disclosed effects such as reaction selectivity as a reaction catalyst for forming urethane bond by using a diisocyanate such as bifunctional compound.

When urethane materials are applied for medical materials, for example, medical instruments such as an ocular lens used in a living organism or by contacting with a living organism, remaining of the above mentioned organic metal compound in a formed urethane compound is not preferable even if the cytotoxicity is comparatively low. A method for removing an organic metal compound from a formed urethane compound has not been reported in detail.

Since the above mentioned urethane compound may be formed as a high viscosity solution according to the molecular weight and kinds of reaction substances, there is no effective purifying method. As a result, it is very difficult to remove the above mentioned impurities such as catalysts and by-products, and therefore the urethane compound is used without purification, and there are problems in safety including the above-mentioned problem.

An object of the present invention is to provide a process for easily preparing a urethane compound, in particular, while molecular weight of the compound is controlled, in the presence of a catalyst showing lower toxicity instead of the conventional organic tin compounds and to provide a process for preparing an ocular lens with the urethane compound.

This and other objects of the present invention will become apparent from the description hereinafter.

SUMMARY OF THE INVENTION

In accordance with the present invention, there is provided a process for preparing an ocular lens with a urethane compound comprising the steps of
 a) preparing a urethane compound by reacting at least one hydroxyl compound and at least one isocyanate compound in the presence of an organic iron compound,
 b) removing the organic iron compound from the urethane compound obtained in the step a)
 c) mixing the urethane compound obtained in the step b) with at least one compound selected from the group consisting of another copolymerizable compound, a crosslinking agent, a UV absorbent, a dye, a polymerization initiator, a photosensitizer, and an organic solvent to obtain a mixture, and
 d) curing the mixture obtained in the step c) to prepare a lens.

In accordance with the present invention, there is also provided a process for preparing a urethane compound for medical instruments, characterized by reacting a hydroxyl compound with an isocyanate compound in the presence of an organic iron compound represented by the formula (I)

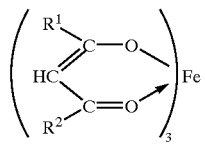

in which each of $R^1$ and $R^2$ is independently selected from the group consisting of methyl group, trifluoromethyl group and phenyl group, as a reaction catalyst to give a urethane compound.

According to the process of the present invention, a urethane compound showing high safety, which is very useful for a material of medical instruments represented by optical materials, such as an ocular lens, can be easily prepared, in particular, while molecular weight of the compound is controlled.

DETAILED DESCRIPTION

One of the features of the present invention is that a reaction between a hydroxyl compound and an isocyanate compound is controlled by using an organic iron compound. In a urethane reaction between hydroxyl compound having at least 2 functional groups and isocyanate compound at least 2 functional groups, it is feared that chain is elongated by bonding repeatedly and the molecular weight of the urethane compound is increased. Therefore, in the present invention, by using an organic iron compound as a catalyst, reaction selectivity of an isocyanate compound having at least 2 functional groups is increased so that the molecular weight is prevented from increasing occurred as by-reaction. When a urethane compound is applied for medical materials, removing process of a catalyst for urethane reaction is necessitated. Therefore, high extractivity of the catalyst from urethane compounds is important. As a method for removing catalysts, generally, a method using organic solvents is suitable, and therefore the solubility of the catalyst in organic solvents is an important parameter. In the present invention, an organic iron compound, which is high safety, has high reactivity, and is extracted easily, is used in a step for preparing a urethane compound by reacting at least one hydroxyl compound and at least one isocyanate compound once or stepwise and repeatedly.

In the process for preparing a urethane compound for medical instruments, as mentioned above, the hydroxyl compound is reacted with the isocyanate compound to give a urethane compound in the presence of the reaction catalyst other than the organic tin compound in order to more accelerate this reaction.

In consideration of the use of the urethane compound as a material for medical instruments, particularly an ocular lens, as the above reaction catalyst, an organic iron compound is used because of excellent safety.

Examples of the above organic iron compound are, for instance, iron diketonate such as iron (III) 2,4-pentandionate (acetylacetonate), iron(III) trifluoropentandionate, iron (III) benzoylacetonate, iron (III) hexafluoropentandionate, iron (III) dibenzoylpentandionate and iron(III) ethoxymethylpentandionate. As the above organic iron compound is preferably represented by the formula (I).

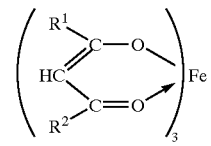

In the formula (I), each of $R^1$ and $R^2$ is independently selected from the group consisting of methyl group, trifluoromethyl group and phenyl group. Because molecular weight of the urethane compound can be more sufficiently controlled, the organic iron compound is particularly preferable.

In order to sufficiently exhibit acceleration effect for the progress of reaction, it is desired that the amount of the reaction catalyst is at least $10^{-6}$ mole, preferably at least $10^{-4}$ mole based on 1 mole of the amount of hydroxyl group in the hydroxyl compound or isocyanate group in the isocyanate compound. In order to prevent removal of the reaction catalyst from being finally difficult after the finish of reaction, it is desired that the amount of the reaction catalyst is at most $10^{-1}$ mole, preferably at most $10^{-2}$ mole based on 1 mole of the amount of hydroxyl group in the hydroxyl compound or isocyanate group of the isocyanate compound. The amount of the reaction catalyst can be suitably adjusted within the above range according to kind of the hydroxyl compound and the isocyanate compound in urethane reactions as mentioned below.

In the present invention, the urethane reaction may be carried out once or repeatedly in stepwise.

For example, a one-step reaction for preparing a urethane compound is as follows. At least one member of dihydroxyl compounds as the hydroxyl compound and at least one member of monoisocyanate compounds as the isocyanate compound are used and reacted in the ratio of 1 mole of the dihydroxyl compound to 2 moles of the monoisocyanate compound. As a result, two urethane bonds are formed.

In the present invention, it is possible that the below urethane compound is prepared by, for instance, the following two-step urethane reactions (i) and (ii).

At first, in the urethane reaction (i), at least one member of dihydroxyl compounds is used as the hydroxyl compound and at least one member of diisocyanate compounds is used as the isocyanate compound, so the dihydroxyl compound is reacted with the diisocyanate compound. As a result, at least two urethane bonds are formed between hydroxyl group in the dihydroxyl compound and isocyanate group in the diisocyanate compound.

When 1 mole of the dihydroxyl compound is reacted with 2 moles of the diisocyanate compound, two urethane bonds are formed and a compound having isocyanate groups in its both ends respectively through two urethane bonds is synthesized. On the other hand, when 2 moles of the dihydroxyl compound is reacted with 1 mole of the diisocyanate compound, two urethane bonds are formed and a compound having hydroxyl groups in its both ends respectively through two urethane bonds is synthesized.

In the urethane reaction (i), the dihydroxyl compound is not limited to one member and the diisocyanate compound is also not limited to one member. So, at least two members of each compound can be used with suitable combination. Accordingly, in a compound synthesized in the urethane reaction (i), units derived from at least two members of the dihydroxyl compounds and/or units derived from at least two members of the diisocyanate compounds can be included.

Then, in the urethane reaction (ii), (a) the compound having isocyanate groups in its both ends obtained in the above urethane reaction (i) is reacted with at least one member of monohydroxyl compounds as the hydroxyl compound, for example, in the ratio of 2 moles of the monohydroxyl compound based on 1 mole of the compound having isocyanate groups in its both ends obtained in the above urethane reaction (i) to form urethane bond; or (b) the compound having hydroxyl groups in its both ends obtained in the above urethane reaction (i) is reacted with at least one member of monoisocyanate compounds as the isocyanate compound, for example, in the ratio of 2 moles of the monoisocyanate compound based on 1 mole of the compound having hydroxyl groups in its both ends obtained in the above urethane reaction (i) to form urethane bond. By each reaction, the urethane compound having at least four urethane bonds is prepared.

Because molecular weight of the aimed urethane compound can be controlled and structure of this compound can be exactly clarified, it is desired that the above two-step urethane reactions (i) and (ii) are carried out in the present invention.

For example, a three-step reaction for preparing a urethane compound is as follows. At least one member of dihydroxyl compounds as the hydroxyl compound and at least one member of diisocyanate compounds as the isocyanate compound are used and reacted, for example, in the ratio of 1 mole of the dihydroxyl compound to 2 moles of the diisocyanate compound. As a result, two urethane bonds are formed between each of two hydroxyl groups in the dihydroxyl compound and one isocyanate group of each of two diisocyanate compounds to produce a compound having isocyanate groups in its both ends through two urethane bonds. Then, at least one member of dihydroxyl compounds same with or different from that used in the prior step as a hydroxyl compound in the ratio of 2 moles to form four urethane bonds in total producing a compound having hydroxyl groups in its both ends. Further, at least one member of monoisocyanate compounds is reacted as an isocyanate compound in the ratio of 2 moles to produce a urethane compound in which six urethane bonds are formed in total.

In the present invention, at least one of the hydroxyl compound or at least one of the isocyanate compound preferably has a polydimethylsiloxane structure having a repetition number of 1 to 1500 from the viewpoint of flexibility and excellent oxygen permeability.

In the present invention, at least one of the hydroxyl compound or at least one of the isocyanate compound preferably has a perfluoropolyether structure having a repetition number of 1 to 1500 from the viewpoint of flexibility and anti-fouling.

In the present invention, at least one of the hydroxyl compound or at least one of the isocyanate compound preferably has a hydrophilic polymer structure having a molecular weight of 100 to 1000000 from the viewpoint of hydrophilicity or water-absorption.

Examples of dihydroxyl compound, monohydroxyl compound, diisocyanate compound, and monoisocyanate compound are as follows.

Typical examples of the dihydroxyl compound are, for instance, a hydroxyl group-containing polysiloxane compound represented by the formula (II):

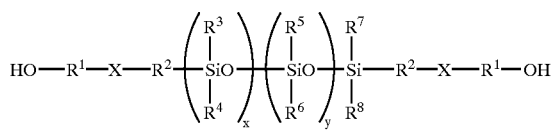

wherein each of $R^1$ and $R^2$ is independently an alkylene group having 1 to 20 carbon atoms, or phenyl, —X— is oxygen, S, direct bond, each of $R^3$, $R^4$, $R^5$, $R^6$, $R^7$ and $R^8$ is independently a linear alkyl group having 1 to 20 carbon atoms, or hydrogena branched alkyl group having 3 to 20 carbon atoms or a cyclic alkyl group having 3 to 20 carbon atoms, which may be substituted with fluorine atom, x is an integer of 1 to 1500, y is an integer of 1 to 1499, and "x+y" is an integer of 1 to 1500; and the like.

In the above formula (II), each of $R^1$ and $R^2$ is preferably an alkylene group having 1 to 10 carbon atoms. Each of $R^3$, $R^4$, $R^5$, $R^6$, $R^7$ and $R^8$ is preferably a linear alkyl group which may be substituted with fluorine atom, having 1 to 5 carbon atoms, a branched alkyl group which may be substituted with fluorine atom, having 3 to 5 carbon atoms, or a cyclic alkyl group which may be substituted with fluorine atom, having 3 to 5 carbon atoms. Also, x is preferably an integer of 1 to 500, y is preferably an integer of 1 to 499, and "x+y" is preferably an integer of 1 to 500.

The other concrete examples of a dihydroxyl compound are, for instance, α,ω-dihydroxyl alkyl perfluoro polyether, polyethylene glycol, polypropylene glycol. Concrete examples of the polyfunctional hydroxyl compound containing hydrophilic polymer structure are poly(vinyl alcohol), poly(2-hydroxyl ethyl (meth)acrylate); as well as a polymer made by inserting a compound having hydroxyl group at polymerization, for example, vinylpyrrolidone (NVP), (meth)acrylic acid, (meth)acrylic acid salt, or a cyclic ether such as a tetrahydrofuran, oxetane derivative; a lactone, lactam such as ε-caprolactone, or ε-caprolactam; a cyclic imino ether such as an oxazoline derivative; dimethylacrylamide, diethylacrylamide; a monomer containing zwitterionic group such as 2-methacryloyloxyethylphosphorylcholine. The polymerization process is not limited. For example, the polymer may be prepared by radical copolymerization with a monomer containing hydroxyl group, or by transforming the end groups to hydroxyl group after ionic polymerization.

Because the molecular weight of the polymer or oligomer segment in a hydroxyl compound influences molecular weight of a final product, the molecular weight is desired to be 100 to 1000000, preferably 100 to 1000000. When the molecular weight is lower than 100, the final product is decreased in molecular weight to become insufficient in mechanical strength, hardness and the like as a polymer. When the molecular weight is higher than 1000000, the final product is excessively increased in molecular weight to become insufficient in mechanical strength, hardness and the like as a polymer.

Typical examples of the diisocyanate compound are, for instance, a diisocyanate compound represented by the formula (III):

$$O=C=N-R^{10}-N=C=O \qquad (III)$$

wherein $R^{10}$ is a linear aliphatic hydrocarbon group having 1 to 20 carbon atoms, a branched hydrocarbon group having 2 to 20 carbon atoms, a cyclic aliphatic hydrocarbon group having 3 to 20 carbon atoms or an aromatic hydrocarbon group having 6 to 20 carbon atoms; and the like.

Concrete examples of the isocyanate compound are, for instance, ethylenediisocyanate, isophoronediisocyanate (IPDI), 1,6-hexamethylenediisocyanate, 1,2-toluenediisocyanate, 1,4-toluenediisocyanate, diisocyanate, bis(2-isocyanatethyl) fumarate, 1,5-naphthalenediisocyanate, cyclohexyl-1,4-diisocyanate, 4,4'-dicyclohexylmethanediisocyanate (HMDI), diphenylmethane-4,4'-diisocyanate, 2,2,4-(2,4,4)-trimethylhexane-1,6-diisocyanate and the like.

Typical examples of the monohydroxyl compound are, for instance, a compound having hydroxyl group and an active unsaturated group, such as a hydroxyalkyl (meth)acrylate, allyl alcohol, vinylbenzyl alcohol, monohydroxyl fumarate, monohydroxyl maleate or monohydroxyl itaconate; and the like.

In consideration of copolymerizability of the aimed urethane compound with the other copolymerizable compound having an active unsaturated group, among the above exemplified compounds, a hydroxyalkyl (meth)acrylate is preferable. Concrete examples of the hydroxyalkyl (meth) acrylate are, for instance, 2-hydroxyethyl (meth)acrylate, 2-hydroxypropyl (meth)acrylate, 3-hydroxypropyl (meth) acrylate, 4-hydroxybutyl (meth)acrylate. For instance, diethylene glycol mono(meth)acrylate, triethylene glycol mono (meth)acrylate, allyl alcohol, ethylene glycol allyl ether, diethylene glycol allyl ether, glycidol, an epoxide drivative having hydroxyl group, an oxetane derivative having hydroxyl group, an oxazoline derivative having hydroxyl group, and the like.

Typical examples of the monoisocyanate compound are, for instance, a compound having isocyanate group and an active unsaturated group, such as allylisocyanate, vinylisocyanate, vinylbenzylisocyanate or 2-isocyanatethyl (meth)acrylate; and the like.

When, for example, the above reaction (b) in the urethane reaction (ii) is carried out, because the number of urethane bond in the urethane compound can be controlled and mechanical strength can be imparted to the urethane compound, it is desired that a compound containing a monoisocyanate compound prepared by reacting the diisocyanate compound with the monohydroxyl compound is used as the monoisocyanate compound. It is particularly desired that only the monoisocyanate compound is used as the monoisocyanate compound.

It is considered that the ratio of the dihydroxyl compound to the diisocyanate compound in the urethane reaction (i) considerably effects for the amount of prepared by-products, the amount of residual non-reacted compounds, and molecular weight and molecular weight distribution of the aimed urethane compound.

In the above-mentioned urethane reaction, from the viewpoint of reduction of residual non-reacted isocyanate groups, it is desired that the total amount of hydroxyl group in the dihydroxyl compound based on 1 mole of isocyanate group in the diisocyanate compound is at least 0.4 mole, preferably at least 0.5 mole, more preferably at least 0.6 mole, particularly preferably at least 0.7 mole, more particularly preferably at least 0.8 mole. From the viewpoint of reduction of residual non-reacted dihydroxyl compound which not bonds to the isocyanate compound through urethane bond, it is desired that the total amount of hydroxyl group in the dihydroxyl compound based on 1 mole of isocyanate group in the diisocyanate compound is at most 2 moles, preferably at most 1.5 moles, more preferably at most 1.35 moles, particularly preferably at most 1.25 moles.

The amount of the dihydroxyl compound and the diisocyanate compound is adjusted within the above range. Then, these compounds are reacted by stirring and mixing with each other.

In the above reaction (a), the monohydroxyl compound to be reacted with the compound having isocyanate groups in its both ends is not limited to one member. At least two members of the monohydroxyl compounds can be suitably used. In the above reaction (b), the monoisocyanate compound to be reacted with the compound having hydroxyl groups in its both ends is not limited to one member. At least two members of the monoisocyanate compounds can be suitably used. As a result, the urethane compound obtained in the reaction (a) or (b) can contain the unit derived from two members of the monohydroxyl compounds or the unit derived from two members of the monoisocyanate compounds.

In accordance that the above urethane reaction (i) is finished only one time or repeatedly carried out stepwise, the number of urethane bond and the number of unit (block) derived from each component in the urethane compound synthesized in the urethane reaction (ii) vary. As a result, for instance, a diblock-type urethane compound is synthesized. Because chain length of each segment in the diblock-type urethane compound is controlled, various different effects can be exhibited.

In the above reaction, reaction time is not particularly limited and suitably adjusted according to kind and combination of each compound. In order to prevent insufficient reaction, it is desired that reaction time is at least 1 minute, preferably at least 30 minutes. In order to prevent polymerization due to polymerizable compounds during reaction, it is desired that reaction time is at most 100 hours, preferably at most 50 hours.

In the above reaction, reaction temperature is not particularly limited and suitably adjusted according to kind and combination of each compound. In order to prevent insufficient reaction, it is desired that reaction temperature is at least −30° C., preferably at least 0° C., and more preferably at least 30° C. In order to prevent polymerization due to polymerizable compounds during reaction, it is desired that reaction temperature is at most 150° C., preferably at most 100° C. In the reaction, each of the reaction temperature in reaction steps can be different from each other.

The hydroxyl compound can be reacted with the isocyanate compound in the absence of a solvent or in the presence of an organic solvent.

Examples of the organic solvent are, for instance, acetone, n-hexane, tetrahydrofuran, benzene, toluene, acetonitrile, methylene chloride and the like.

When the organic solvent is used, in order to remove the fear that it becomes difficult to react the hydroxyl compound with the isocyanate compound, and so, the yield of the urethane compound is lowered, it is desired that the total concentration of the hydroxyl compound and the isocyanate compound in the organic solvent is at least 0.01 mol/L, preferably at least 0.1 mol/L. That is, the amount (volume) of the organic solvent can be calculated according to the total concentration of the hydroxyl compound and the isocyanate compound. A reaction solution composed of the hydroxyl compound, the isocyanate compound and the organic solvent is sufficiently stirred or shaken so that the reaction uniformly proceeds. In the reaction, the solvent can be presence or absence in each of reaction steps independently.

In accordance with the above steps, the aimed urethane compound can be prepared. After finishing the reaction for preparing the urethane compound, it is desired that the urethane compound is purified by removing non-reacted compounds, compounds having lower molecular weight (by-products) and catalysts.

For purification of the urethane compound, an organic solvent is preferably used. In addition, the urethane compound can be purified by using a supercritical fluid with referring to "Polymer Applications, Vol. 43, No. 11, p. 38 (1994)".

As the above organic solvent for purification, a solvent which can dissolve the non-reacted compounds, by-products and catalysts or can dissolve the urethane compound is used. Typical examples of the organic solvent are, for instance, methanol, ethanol, acetone, tetrahydrofuran, acetonitrile, methylene chloride, hexane and the like. These can be used alone or in admixture thereof. In order to more effectively purify the urethane compound, methanol, acetonitrile and methylene chloride, a mixed solvent of hexane and methanol and a mixed solvent of hexane and acetonitrile are preferably used.

An organic solvent, which dissolves an organic iron compound, is desired for removing effectively the organic iron compound as a catalyst. There are more large kinds of organic solvents, which dissolves an organic iron compound (iron diketonate) used in the present invention, than organic solvents, which dissolves other metal diketonates. An organic iron compound is soluble more easily than the other organic metal compounds. For removing an organic iron compound from the urethane compound, it is effective that the organic iron compound is more easily extracted.

In order to sufficiently remove the non-reacted compounds, by-products and catalysts, it is desired that the amount of the organic solvent is, on the basis of the volume, at least 1/20 time, preferably at least 1/10 time of the amount of the urethane compound. In order to prevent the amount of waste fluid from increasing after purification, it is desired that the amount of the organic solvent is, on the basis of the volume, at most 20 times, preferably at most 10 times, and more preferably at most 5 times of the amount of the urethane compound.

As the above supercritical fluid for purification, a fluid in the supercritical state, such as water, carbon dioxide, methanol, ethane or propane may be cited. Carbon dioxide is preferable among them, because the extraction can be carried out at around a normal temperature due to its critical temperature of about 31° C., because quality of the extract changes in low degree by chemical change due to its inactivity in practical use, because the residual amount in the extract is low due to its gas state under the atmospheric pressure, because it is safety gas due to no toxicity and nonflammability, and because it can be supplied in large amount due to low cost.

An extraction with supercritical fluid comprising a step extracting a catalyst and a lower molecular weight compound from a urethane compound and a step separating the urethane compound from the solvent (the supercritical fluid). For example, in removing by a pressure swing method, the supercritical fluid is transferred by a pump from a storage to an extractor through one heat exchanger to compress the fluid to an extraction pressure and another heat exchanger to adjust the temperature of the fluid to an extraction temperature. In the process, the supercritical fluid contacted with an urethane compound in the extractor and containing a catalyst and a low molecular weight compound is decompressed and transferred to a separator through a heat exchanger, and the catalyst and the lower molecular weight compound are separated from the supercritical fluid. The supercritical fluid flowing out from the separator in gas state is purified with filter, and reused.

Condition as to purification with the supercritical fluid varies according to molecular weight and chemical structure of the urethane compound. So, the condition cannot be sweepingly determined. For instance, it is desired that treating pressure is 5 to 100 MPa, and treating temperature is 0° to 100° C.

In order to more effectively extract the compounds having lower molecular weight, an auxiliary for extraction can be used during purification of the urethane compound with the supercritical fluid. Examples of the auxiliary for extraction are, for instance, acetonitrile, methanol and the like.

The urethane compound produced in the present invention may have an ethylenic unsaturated group capable of radical polymerization or a functional group capable of photo cationic crosslinking. The ethylenic unsaturated group capable of radical polymerization may be, for example, a group derived from (meth)acrylate group, allyl group, or vinyl group. The functional group capable of photo cationic crosslinking may be, for example, a cyclic ether derivative such as epoxide, oxetane, or cyclohexene oxide; a cyclic sulfide derivative; a cyclic iminoether derivative such as oxazoline. The introducing method for an ethylenic unsaturated group capable of radical polymerization or a functional group capable of photo cationic crosslinking into a urethane compound is not limited. For example, a hydroxyl compound derivative or isocyanate compound derivative having at least one of these groups can be used. These groups can be introduced into a urethane compound at a residual reactive group of the urethane compound by a post-treatment. As an example of introduction by a post-treatment, when polysiloxane diol having hydrosilane group is selected as dihydroxyl group, these functional group can be easily introduced into polysiloxane diol by hydrosilylation with allyl oxetane and the like in the presence of a platinum catalyst.

The introducing ratio of the functional group is not particularly limited, but the ratio is desirably adjusted because the ratio influences properties of an ocular lens made by using the urethane compound, particularly mechanical property.

When the urethane compound is prepared by the urethane reaction (i) or (ii), in order to prevent active unsaturated groups in each compound from polymerizing with each other, it is desired that a polymerization inhibitor is suitably used.

Examples of the polymerization inhibitor are, for instance, a stable radical compound; an addition inhibitor such as oxygen, a benzoquinone derivative or a nitro compound; and the like. Hydroquinone, hydroquinone methyl ether, p-methoxyphenol and butylhydroxytoluene are preferably exemplified. It is desired that the amount of the polymerization inhibitor based on 100 parts by weight (hereinafter referred to as "part(s)") of all the compounds having an active unsaturated group is about 0.01 to 1 part.

In the present invention, an ocular lens can be obtained by curing a mixture of a urethane compound having the above-mentioned ethylenic unsaturated group capable of radical polymerization or functional group capable of photo cationic crosslinking, and at least one compound selected from the group consisting of another copolymerizable monomer, a crosslinking agent, a UV absorbent, a dye, a polymerization initiator, a photo sensitizer and an organic solvent to produce a lens.

The copolymerizable monomer, crosslinking agent, UV absorber, dye, polymerization initiator, photo sensitizer, and organic solvent are not particularly limited, and can be selected preferably according to desired properties of the ocular lens.

For example, the compound described in Japanese Patent Publication No.2774233, WO 01/71415, or Japanese Examined Patent Publication No. 55122/1987 can be used. As a hydrophilic monomer, acryloyl morpholine, and N-methyl-3-methylene-2-pyrrolidone can be used.

The curing method for the above-mentioned mixture is not particularly limited. The mixture can be cured by adding a thermal polymerization initiator for thermal curing, or by adding a photo initiator and a photo sensitizer for photo curing. Curing with electron beam can be cited by selecting the acrylic group as ethylenic unsaturated group.

An ocular lens material obtained in such a manner can be used for a hard lens, a soft lens containing water or an intraocular lens, artificial cornea, cornea onlay, cornea inlay, and is not particularly limited in its shape.

The obtained ocular lens can be subjected to a surface modification, for example, plasma treatment (with oxygen, nitrogen, argon, helium and the like or mixtures thereof), UV irradiation, Excimer UV irradiation, plasma polymerization (with a mixture of methane/air and the like), graft polymerization with a hydrophilic monomer such as DMA, NVP or PEG.

According to the process of the present invention, the urethane compound showing high safety, which is very useful for a material of medical instruments represented by optical materials such as an ocular lens can be easily prepared, in particular, while molecular weight of the compound is controlled.

The process for preparing a urethane compound for medical instruments or an ocular lens of the present invention is more specifically described and explained by means of the following Examples. It is to be understood that the present invention is not limited to the Examples, and various changes and modifications may be made in the invention without departing from the spirit and scope thereof.
<Catalytic Reactivity>

EXAMPLE A1

(FeAA)

A 100 mL three-necked flask having a side tube equipped with Dimroth reflux condenser, a mechanical stirrer and a thermometer was previously substituted with nitrogen gas and charged with 15.50 g (100 mmole) of IEM and 0.035 g (0.1 mmole) of FeAA. Then, the flask was charged with 5.40 g (100 mmole) of 1-butanol and stirred at 23° C. A part of the obtained reaction mixture was sampled after one hour to detect given products with GC/MS analysis. Conversion rate of IEM was estimated from the proportion of the products. The result is shown in TABLE 1.

$^1$H-NMR analysis, FT/IR analysis, SEC analysis, evaluation of transparency and cytotoxicity test were carried out in accordance with the following methods, respectively.

(I) $^1$H-NMR Analysis $^1$H-NMR spectrum was examined under the following conditions.
Fourier transform NMR spectrometer: GEMINI2000/400BB type, made by Varian Technologies Limited
Nuclear: $^1$H (resonance frequency: 400.42 MHz)
Solvent: $CDCl_3$
Test sample: About 5 to 10 w/v % $CDCl_3$ solution
Measuring temperature: About 22° C.

(II) FT/IR Analysis

FT/IR spectrum was examined under the following conditions.
Infrared spectrophotometer: FT/IR-8300, made by Nippon Bunko Kabushiki Kaisha
Method: KBr disk method (III) SEC Analysis SEC analysis was carried out under the following conditions.
SEC system: Made by Nippon Bunko Kabushiki Kaisha
  Column oven: 860-CO made by Nippon Bunko Kabushiki Kaisha
  Degasser: DG-980-50 made by Nippon Bunko Kabushiki Kaisha
  Pump: PU-980 made by Nippon Bunko Kabushiki Kaisha
  Detector (RI type): 830-RI made by Nippon Bunko Kabushiki Kaisha
    (UV type): SPD-10A made by SHIMAZU CORPORATION
Column: Ultrastyragel Plus MX $10^3$ Å made by Waters Co. (two columns connected in series)
Eluent: Tetrahydrofuran
Calibration curve: Produced by using standard polystyrene (IV) Evaluation of Transparency The test sample was observed with naked eye.

(V) Cellular Toxicity Test (Test as to Prevention for Preparation of Colony)

The test was carried out in accordance with the guideline of "Basic biological test of medical instruments and medical materials" (MEDICAL DEVICES DIVISION PHARMACEUTICAL AFFAIRS BUREAU Notification No. 99, 1995, published on Jun. 27, 1995 in Japan). Then, biological safety of the test sample was evaluated.

EXAMPLE A2

(FeTFPD)

The same procedure of Example A1 was carried out except that 0.052 g (0.1 mmole) of Iron (III) trifluoropentandionate (FeTFPD) was used instead of 0.035 g (0.1 mmole) of FeAA. The result is shown in TABLE 1.

EXAMPLE A3

(FeBzAc)

The same procedure of Example A1 was carried out except that 0.055 g (0.1 mmole) of Iron (III) benzoylacetonate (FeBzAc) was used instead of 0.035 g (0.1 mmole) of FeAA. The result is shown in TABLE 1.

Comparative Example A1

(ZnAA)

The same procedure of Example A1 was carried out except that 0.026 g (0.1 mmole) of Zinc acetylacetonate (ZnAA) was used instead of 0.035 g (0.1 mmole) of FeAA. The result is shown in TABLE 1.

Comparative Example A2

(CuAA)

The same procedure of Example A1 was carried out except that 0.026 g (0.1 mmole) of Copper acetylacetonate (CuAA) was used instead of 0.035 g (0.1 mmole) of FeAA. The result is shown in TABLE 1.

TABLE 1

| No. | Catalyst | Conversion rate of IEM (%) |
| --- | --- | --- |
| Ex. A1 | FeAA | 78 |
| Ex. A2 | FeTFPD | 77 |
| Ex. A3 | FeBzAc | 74 |
| Com. Ex. A1 | ZnAA | 65 |
| Com. Ex. A2 | CuAA | 37 |

<Catalytic Reactivity and Selectivity>

EXAMPLE A4

(FeAA)

A 100 mL three-necked flask having a side tube equipped with Dimroth reflux condenser, a mechanical stirrer and a thermometer was previously substituted with nitrogen gas and charged with 22.21 g (100 mmole) of IPDI and 0.035 g (0.1 mmole) of FeAA. Then, the flask was charged with 11.60 g (100 mmole) of HEA and stirred at 23° C. A part of the obtained reaction mixture was sampled after three hours to detect given products with GC/MS analysis. Conversion rate of IPDI and selectivity were estimated from the proportion of the products. The results are shown in TABLE 2.

The reaction carried out in this Example is shown in the following Scheme 1. In Scheme 1, k1, k2, k3 and k4 indicate a reaction velocity constant of each reactions respectively.

A monourethane given by urethane reaction of primary isocyanate group of IPDI (prim.-mono urethane: p-mU) and a monourethane given by urethane reaction of secondary isocyanate group of IPDI (sec.-mono urethane: s-mU) were isolated by GC. These monourethanes were detected as trans-form and cis-form respectively. T (=k1/k2) indicating selectivity was estimated from the ratio of GC area of each products.

When T is equal to 1, reactivity of primary isocyanate group (k2) is equal to that of secondary isocyanate group (k1) giving a large amount of by-products having a high molecular weight. When T is much larger than 1, reactivity of primary isocyanate group (k2) is much smaller than that of secondary isocyanate group (k1) giving a small amount of by-products having a high molecular weight.

EXAMPLE A5

(FeDBzPD)

The same procedure of Example A4 was carried out except that 0.061 g (0.1 mmole) of FeDBzPD was used instead of FeAA. The result is shown in TABLE 2.

EXAMPLE A6

(AlAA)

The same procedure of Example A4 was carried out except that 0.055 g (0.1 mmole) of AlAA was used instead of FeAA. The result is shown in TABLE 2.

Comparative Example A3

(ZnAA)

The same procedure of Example A4 was carried out except that 0.026 g (0.1 mmole) of ZnAA was used instead of FeAA. The result is shown in TABLE 2.

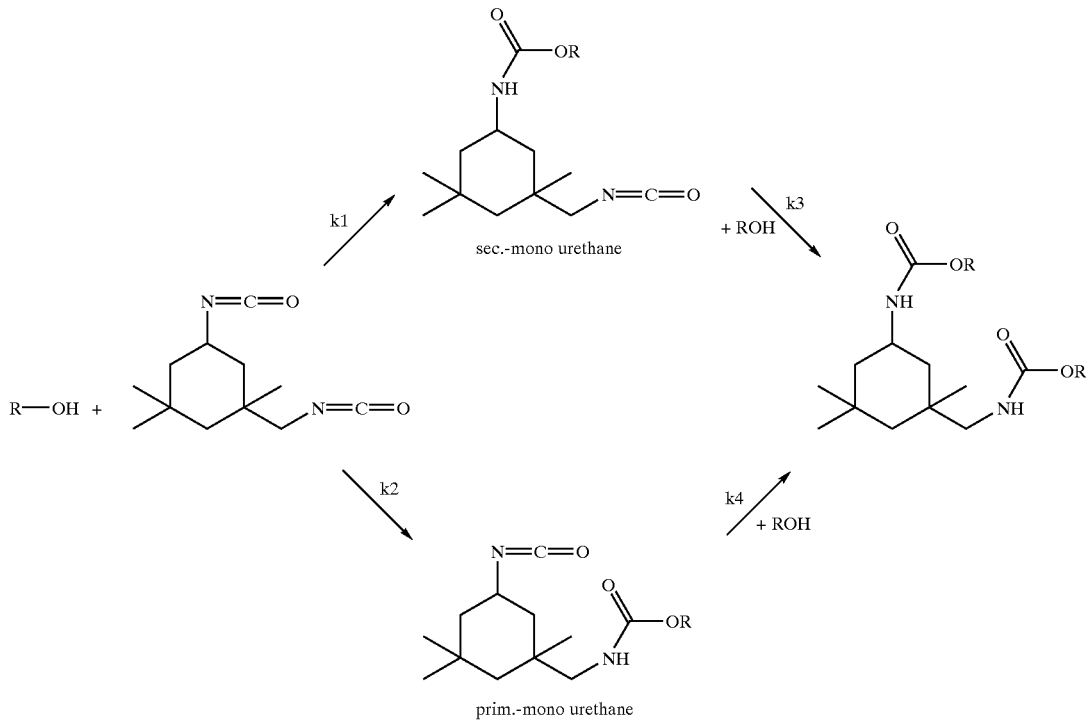

Comparative Example A4

(CuAA)

The same procedure of Example A4 was carried out except that 0.026 g (0.1 mmole) of CuAA was used instead of FeAA. The result is shown in TABLE 2.

Comparative Example A5

(Manganese (III) Acetylacetonate: MnAA)

The same procedure of Example A4 was carried out except that 0.025 g (0.1 mmole) of MnAA was used instead of FeAA. The result is shown in TABLE 2.

Comparative Example A6

(Aluminium (III) Acetylacetonate: AlAA)

The same procedure of Example A4 was carried out except that 0.032 g (0.1 mmole) of AlAA was used instead of FeAA. The result is shown in TABLE 2.

Comparative Example A7

(BSnL)

The same procedure of Example A4 was carried out except that 0.063 g (0.1 mmole) of BSnL was used instead of FeAA. The result is shown in TABLE 2.

TABLE 2

| No. | Catalyst | Conversion rate of IPDI (%) | Selectivity s-mU/p-mU |
|---|---|---|---|
| Ex. A4 | FeAA | 77 | 4.0 |
| Ex. A5 | FeDBzPD | 75 | 3.8 |
| Ex. A6 | FeBzAc | 75 | 3.7 |
| Com. Ex. 3 | ZnAA | 60 | 2.5 |
| Com. Ex. 4 | CuAA | 35 | 2.8 |
| Com. Ex. 5 | MnAA | 82 | 1.7 |
| Com. Ex. 6 | AlAA | 24 | 1.4 |
| Com. Ex. 7 | BSnL | 73 | 5.8 |

EXAMPLE A7

(FeAA)

A 100 mL three-necked flask having a side tube equipped with Dimroth reflux condenser, a mechanical stirrer and a thermometer was previously substituted with nitrogen gas and charged with 26.25 g (100 mmole) of HMDI and 0.035 g (0.1 mmole) of FeAA. Then, the flask was charged with 11.60 g (100 mmole) of HEA and stirred at 23° C.

A part of the obtained reaction mixture was sampled after three hours to detect given products with GC/MS analysis. Conversion rate of HMDI was estimated from the proportion of the products. Selectivity was estimated from the molar ratio of mono-adduct to diadduct (mono-U/di-U). The result is shown in TABLE 3.

Comparative Example A8

(ZnAA)

The same procedure of Example A7 was carried out except that 0.026 g (0.1 mmole) of ZnAA was used instead of 0.035 g (0.1 mmole) of FeAA. The result is shown in TABLE 3.

Comparative Example A9

(CuAA)

The same procedure of Example A7 was carried out except that 0.026 g (0.1 mmole) of CuAA was used instead of FeAA. The result is shown in TABLE 3.

TABLE 3

| No. | Catalyst | Conversion rate of HMDI (%) | Selectivity mono-U/di-U |
|---|---|---|---|
| Ex. 3 | FeAA | 74 | 2.6 |
| Com. Ex. 8 | ZnAA | 62 | 1.9 |
| Com. Ex. 9 | CuAA | 38 | 2.3 |

The results in TABLE 1 indicate that an organic iron catalyst (FeAA) has the highest activity to reaction of an isocyanate compound having one functional group with a hydroxyl compound.

The results in TABLES 2 and 3 indicate that only Iron diketonate is effective for increasing selectivity in reaction of IPDI and HMDI. Among various organic metal catalysts, especially metal acetylacetonate complexes, only Iron diketonate such as a FeAA provides a high selectivity in reaction of IPDI and HMDI.

<Solubility of Catalysts>

Solubility of a various kind of catalysts in a various kind of solvents (water, methanol, acetone, acetonitrile, n-hexane, methylene chloride) was evaluated by studying maximum amount of catalysts completely soluble in a various kind of solvents.

TABLE 4

| | Solubility (mg/mL) | | | | | |
|---|---|---|---|---|---|---|
| Catalyst | water | methanol | acetone | acetonitrile | n-hexane | methylene chloride |
| FeAA | 1 | 50 | 25 | 50 | 1 | 50 |
| ZnAA | insoluble | 50 | 1 | insoluble | insoluble | 10 |
| CuAA | insoluble | insoluble | 1 | insoluble | insoluble | 10 |
| MnAA | insoluble | 10 | 1 | insoluble | insoluble | 1 |
| AlAA | insoluble | 50 | 50 | 50 | insoluble | 50 |
| BSnL | insoluble | 50 | 50 | 50 | 50 | 50 |

The results in TABLE 4 show that FeAA has high solubility to various organic solvents compared with other catalysts. In addition, FeAA dissolves slightly in water. FeAA is removed by using water as well as using a various kind of organic solvents.

<Residual Catalyst>

EXAMPLE B1

(FeAA)

A one-litter three-necked flask having a side tube equipped with Dimroth reflux condenser, a mechanical stirrer and a thermometer was previously substituted with nitrogen gas and charged with 280.80 g of polydimethylsiloxane containing hydroxyl groups in its both ends (polymerization degree: 40, Hydroxyl group equivalent: 1560 g/mole supplied by Aldrich, code name: KF-6002, made by Shin-Etsu Chemical Co., Ltd.; hereinafter referred to as "DHDMSi-40"). Then, the flask was charged with 1 mL of an acetonitrile solution in which 0.12 g of FeAA was previously dissolved, and then heated in an oil bath at 80° C. and stirred. Then the flask was charged with 62.0 g (0.40 mole) of 2-isocyanatoethylmethacrylate (IEM) and stirred for 4 hours until the peak at about 2230 $cm^{-1}$ indicating isocyanate group was disappeared in FT/IR analysis. A part of the reaction mixture was sampled for structural analysis to detect formation of an intermediate product with $^1$H-NMR and FT/IR.

$^1$H-NMR (in $CDCl_3$); δ0.06 (Si—$CH_3$, m), 0.52 (Si—$CH_2$, 2H, m), 1.94 (—$CH_3$, 3H, s), 2.91 (NH—$CH_2$, 2H, d), 3.02 ($CH_2$—N=C=O, 2H, s), 3.42 (—O—$CH_2$, 2H, t), 3.61 (—O—$CH_2$, 2H, m), 4.85 (NH, 1H, s), 5.59(CH=, 1H, s), 6.12 (CH=, 1H, s)

FT/IR: 1630 (C=C), 1262 and 802 $cm^{-1}$ (Si—$CH_3$), 1094 and 1023 (Si—O—Si), adjacent to 1728 (C=O and ester, urethane)

A crude urethane product obtained as above and dissolved in 2 L of n-hexane was transferred to 5 L separatory funnel having a side tube. Then, the separatory funnel was charged with 500 mL of acetonitrile, stirred for 10 min at about 500 rpm, and then left to stand. The acetonitrile phase was removed. The washing with acetonitrile was carried out. The n-hexane phase was recovered and organic solvents and lower molecular weight compounds were stripped under reduced pressure. A purified urethane compound of 294.80 g was obtained (Yield 86%).

The amounts of residual iron catalyst in the purified compound were detected by absorptiometry. The safety was evaluated by cytotoxicity test (colony assay). The molecular weight was measured and lower molecular weight compounds were detected by SEC. The results are shown in TABLES 5, and 6.

EXAMPLE B2

(FeDBzPD)

The same procedure of Example B1 was carried out except that 0.20 g of FeDBzPD was used instead of FeAA. The result is shown in TABLES 5, and 6.

EXAMPLE B3

(FeAA)

A one-litter three-necked flask having a side tube equipped with Dimroth reflux condenser, a mechanical stirrer and a thermometer was previously substituted with nitrogen gas and charged with 75.48 g (0.34 mmole) of IPDI and 0.12 g of FeAA. Then, the flask was charged with 529.90 g of DHDMSi-40, heated in an oil bath at 80° C., and stirred for about 4 hours. A part of the reaction mixture was sampled for structural analysis to detect formation of an intermediate product with $^1$H-NMR and FT/IR.

$^1$H-NMR (in $CDCl_3$); δ0.06 (Si—$CH_3$, m), 0.52 (Si—$CH_2$, 2H, m), 2.91 (NH—$CH_2$, 2H, d), 3.02 ($CH_2$—N=C=O, 2H, s), 3.42 (—O—$CH_2$, 2H, t), 3.61 (—O—$CH_2$, 2H, m), 4.54 (NH, 1H, s), 4.85 (NH, 1H, s)

FT/IR: 1262 and 802 $cm^{-1}$ (Si—$CH_3$), 1094 and 1023 (Si—O—Si), adjacent to 1728 (C=O, urethane), 2227 (N=C=O)

Then, the flask was charged with 39.47 g (0.34 mole) of HEA and 0.20 g of p-methoxyphenol (MEHQ) as a polymerization inhibitor, and stirred in an oil bath at 80° C. After about three hours, formation of a urethane compound was detected with $^1$H-NMR and FT/IR.

$^1$H-NMR (in $CDCl_3$); δ0.06 (Si—$CH_3$, m), 0.52 (Si—$CH_2$, 2H, m), 2.91 (NH—$CH_2$, 2H, d), 3.02 ($CH_2$—N=C=O, 2H, s), 3.42 (—O—$CH_2$, 2H, t), 3.61 (—O—$CH_2$, 2H, m), 4.18–4.34 (—(O)CO—$CH_2$—, 6H, m), 4.54 (NH, 1H, s), 4.85 (NH, 1H, s), 5.84 (CH=, 1H, dd), 6.14 (CH=, 1H, dd), 6.43 (CH=, 1H, dd)

FT/IR: 1262 and 802 $cm^{-1}$ (Si—$CH_3$), 1094 and 1023 (Si—O—Si), 1632 (C=C), adjacent to 1728 (C=O, ester and urethane)

A crude urethane compound obtained as above and dissolved in 2 L of n-hexane was transferred to 5 L separatory funnel having a side tube. Then, the separatory funnel was charged with 500 mL of acetonitrile, stirred for 10 min at about 500 rpm, and then left to stand. The acetonitrile phase was removed. The washing with acetonitrile was carried out twice. The n-hexane phase was recovered and organic solvents and lower molecular weight compounds were stripped under reduced pressure. A purified urethane compound of 522.33 g was obtained (Yield 81%).

When methanol was used instead of above acetonitrile, a purified urethane compound of 483.60 g was obtained (Yield 75%).

The amounts of residual organic iron catalyst in the purified compound were detected by absorptiometry.

The safety was evaluated by cytotoxicity test (colony assay). The molecular weight was measured and lower molecular weight compounds were detected by SEC. The results are shown in TABLES 5, and 6.

EXAMPLE B4

(FeAA)

A 100 g of the urethane compounds obtained by the same procedure as that of Example B3 was transferred to an extractor to remove the catalyst and lower molecular weight compounds by using supercritical carbon dioxide gas providing 85.80 g of a purified urethane compound. The obtained purified compound was evaluated in the same procedure as that of Example B3. The results are shown in TABLES 5, and 6.

EXAMPLE B5

(FeBzAc)

A urethane compound is prepared in the same procedure as that of Example B3 except that 0.06 g of FeBzAc instead of FeAA, 22.30 g (0.10 mole) of IPDI, 167.10 g of polydimethylsiloxane containing hydroxyl groups in its both ends (polymerization degree: 40, Hydroxyl group equivalent: 1700 g/mole supplied by Aldrich, code name: KF-6002, made by Shin-Etsu Chemical Co., Ltd.; DHDMSi-40), 11.80 g (0.10 mole) of HEA, and 0.06 g of p-methoxyphenol (MEHQ) as a polymerization inhibitor were used providing 154.90 g (using acetonitrile, Yield 77%), 152.94 g (using methanol, Yield 76%) of a purified urethane compound. The obtained purified compound was evaluated in the same procedure as that of Example B3. The results are shown in TABLES 5, and 6.

EXAMPLE B6

(FeAA)

A purified urethane compound of 490.10 g (Yield 76%) was obtained in the same procedure as that of Example B3 except that 87.70 g of 4,4'-dicyclohexylmethandiisocyanate (DCHMDI) were used instead of IPDI as isocyanate compound. The obtained purified compound was evaluated in the same procedure as that of Example B3. The results are shown in TABLES 5, and 6.

EXAMPLE B7

(FeAA)

A one-litter three-necked flask having a side tube equipped with Dimroth reflux condenser, a mechanical stirrer and a thermometer was previously substituted with nitrogen gas and charged with 44.60 g (0.20 mole) of IPDI and 0.07 g of FeAA. Then, the flask was charged with 90.80 g of a polydimethylsiloxane containing hydroxyl groups in its both ends (polymerization degree: 10, Hydroxyl group equivalent: 1000 g/mol supplied by Aldrich, code name: KF-6001, made by Shin-Etsu Chemical Co., Ltd.; hereinafter referred to as "DHDMSi-10"), heated in an oil bath at 80° C., and stirred for about 4 hours. A part of the reaction mixture was sampled for structural analysis to detect formation of an intermediate product with $^1$H-NMR and FT/IR.

Then, the flask was charged with a solution of 0.07 g of FeAA and 156.80 g of polyethylene glycol (Hydroxyl group equivalent: 1020 g/mole, supplied by Aldrich) in 200 ml of chloroform and refluxed for about 4 hours. A part of the reaction mixture was sampled and stripped to remove the solvent under the reduced pressure in order to measure the hydroxyl group equivalent (Acetylation method, 4210 g/mole).

A three necked flask charged with 106.50 g of the intermediate product was charged with 7.90 g (0.05 mole) of 2-isocyanatoethyl methacrylate (IEM). The three-necked flask was charged with 0.05 g of MEHQ as a polymerization inhibitor, and stirred in an oil bath at 80° C. After about three hours, formation of a urethane compound was detected with $^1$H-NMR and FT/IR.

$^1$H-NMR (in CDCl$_3$); δ0.06 (Si—CH$_3$, m), 0.52 (Si—CH$_2$, 2H, m), 2.91 (NH—CH$_2$, 2H, d), 3.02 (CH$_2$—N=C=O, 2H, s), adjacent to 3.5 (—O—CH$_2$, m), 4.18–4.34 (—(O)CO—CH$_2$—, 6H, m), 4.54 (NH, 1H, s), 4.85 (NH, 1H, s), 5.84 (CH=, 1H, dd), 6.14 (CH=, 1H, dd), 6.43 (CH=, 1H, dd)

FT/IR: 1262 and 802 cm$^{-1}$ (Si—CH$_3$), 1094 and 1023 (Si—O—Si), 1632 (C=C), adjacent to 1728 (C=O, ester and urethane)

A crude urethane compound obtained as above and dissolved in 1 L of n-hexane was transferred to 5 L separatory funnel having a side tube. Then, the separatory funnel was charged with 200 mL of acetonitrile, stirred for 10 min at about 500 rpm, and then left to stand. The acetonitrile phase was removed. The washing with acetonitrile was carried out twice. The n-hexane phase was recovered and organic solvents and lower molecular weight compounds were stripped under reduced pressure. A purified urethane compound of 84.56 g was obtained (Yield 74%).

The obtained purified compound was evaluated in the same procedure as that of Example B3. The results are shown in TABLES 5, and 6.

EXAMPLE B8

(FeAA)

A one-litter three-necked flask having a side tube equipped with Dimroth reflux condenser, a mechanical stirrer and a thermometer was previously substituted with nitrogen gas and charged with 4.46 g (0.020 mole) of IPDI and 0.01 g of FeAA. Then, the flask was charged with 16.85 g of a polydimethylsiloxane containing hydroxyl groups in its both ends (polymerization degree: 40, Hydroxyl group equivalent: 1700 g/mol supplied by Aldrich, code name: KF-6002, made by Shin-Etsu Chemical Co., Ltd.; DHDMSi-40), heated in an oil bath at 80° C., and stirred for about 4 hours. A part of the reaction mixture was sampled for structural analysis to detect formation of an intermediate product with $^1$H-NMR and FT/IR.

Then, the flask was charged with a previously prepared solution of 0.07 g of FeAA and 44.35 g of polyvinylpyrrolidone having hydroxyl groups and cationically crosslinkable group (2420 g/mole of hydroxyl group equivalent) in 200 ml of chloroform, and refluxed for about 4 hours. The polyvinylpyrrolidone was prepared by a thermal polymerization of N-vinylpyrrolidone, 3-ethyl-3-allyloxymethyloxetane, and 2-mercaptoethanol by using 2,2'-azobisisobutyronitrile (AIBN). A part of the reaction mixture was sampled to detect formation of a urethane compound with $^1$H-NMR and FT/IR.

A crude urethane compound obtained as above and dissolved in 500 mL of n-hexane was transferred to 5 L separatory funnel having a side tube. Then, the separatory funnel was charged with 50 mL of acetonitrile, stirred for 10 min at about 500 rpm, and then left to stand. The acetonitrile phase was removed. The washing with acetonitrile was carried out twice. The n-hexane phase was recovered and organic solvents and lower molecular weight compounds were stripped under reduced pressure. A purified urethane compound of 43.20 g was obtained (Yield 72%).

The obtained purified compound was evaluated in the same procedure as that of Example B3. The results are shown in TABLES 5, and 6.

EXAMPLE B9

(ZnAA)

The same procedure of EXAMPLE B1 was carried out except that 195.0 g of perfluoropolyether (supplied by AUSIMONT JAPAN, and a polydimethylsiloxane containing hydroxyl groups in its both ends (polymerization degree: 40, Hydroxyl group equivalent: 1560 g/mole supplied by Aldrich, code name: KF-6002, made by Shin-Etsu Chemical Co., Ltd.) was used instead of DHDMSi-40. The results are shown in TABLES 5, and 6.

Comparative Example B1

(ZnAA)

A urethane compound was prepared providing 477.25 g (Yield 74%) of a purified urethane compound by the same procedure as that of Example B3 except that 0.09 g of ZnAA was used instead of FeAA. The same prodecure was carried out except that methanol was used instead of acetonitrile (Yield 67%, 432.13 g). The obtained purified compounds were evaluated in the same procedure as that of Example B3. The results are shown in TABLES 5, and 6.

Comparative Example B2

(CuAA)

A purified urethane compound of 451.40 g (Yield 70% using acetonitrile for washing) or 399.87 g (Yield 62% using methanol for washing) was obtained in the same procedure as that of Comparative Example B1 except that 0.09 g of CuAA was used instead of ZnAA as a catalyst. The obtained purified compound was evaluated in the same procedure as that of Example B3. The results are shown in TABLES 5, and 6.

Comparative Example B3

(BSnL)

A purified urethane compound of 522.30 g (Yield 81% using acetonitrile for washing) or 490.25 g (Yield 76% using methanol for washing) was obtained in the same procedure as that of Comparative Example B1 except that 0.08 g of BSnL was used instead of ZnAA as a catalyst. The obtained purified compound was evaluated in the same procedure as that of Example B3. The results are shown in TABLES 5, and 6.

Comparative Example B4

(Triethylamine: TEA)

A purified urethane compound of 279.30 g (Yield 70%) was obtained in the same procedure as that of Comparative Example B1 except that 0.04 g of TEA was used instead of ZnAA as a catalyst. The obtained purified compound was evaluated in the same procedure as that of Example B3. The results are shown in TABLES 5, and 6.

using an iron diketonate catalyst, the molecular weight was easily controlled as well as the safety was high.

TABLE 6

| No. | Catalyst | Solvents | Yield (%) | Residual catalyst (ppm) |
|---|---|---|---|---|
| Ex. B1 | FeAA | hexane/$CH_3CN$ | 86 | Not detected |
| Ex. B2 | FeTFPD | hexane/$CH_3CN$ | 85 | Not detected |
| Ex. B3 | FeAA | hexane/$CH_3CN$ | 81 | Not detected |
|  |  | hexane/$CH_3OH$ | 75 | Not detected |
| Ex. B4 | FeAA | Super critical $CO_2$ | 86 | Not detected |
| Ex. B5 | FeBzAc | hexane/$CH_3CN$ | 77 | Not detected |
|  |  | hexane/$CH_3OH$ | 76 | Not detected |
| Ex. B6 | FeAA | hexane/$CH_3CN$ | 81 | Not detected |
| Ex. B7 | FeAA | hexane/$CH_3OH$ | 74 | Not detected |
| Ex. B8 | FeAA | hexane/$CH_3OH$ | 72 | Not detected |
| Ex. B9 | FeAA | hexane/$CH_3CN$ | — | Not detected |
| Comp. B1 | ZnAA | hexane/$CH_3CN$ | 74 | 90 |
|  |  | hexane/$CH_3OH$ | 67 | 40 |
| Comp. B2 | CuAA | hexane/$CH_3CN$ | 70 | 110 |
|  |  | hexane/$CH_3OH$ | 62 | 120 |
| Comp. B3 | BSnL | hexane/$CH_3CN$ | 81 | 40 |
|  |  | hexane/$CH_3OH$ | 76 | Not tested |
| Comp. B4 | TEA | hexane/$CH_3CN$ | 70 | Not detected |

By using a metal acetylacetonate other than iron diketonate, the reaction time was elongated due to the low reactivity, and the yield was low after extraction with organic solvents. The facts indicate that low molecular weight impurities were presented in the crude products in a large amount. Further, deference in the amount of the residual catalyst was apparent (TABLE 5).

From the above-mentioned facts, the process using iron diketonate having low toxicity can decrease the amount of the residual catalyst and therefore the process is a safety process.

TABLE 5

| No. | Catalyst | Mn (SEC) | Mw/Mn (SEC. %) | Sub-Product | Appearance | Cytotoxicity |
|---|---|---|---|---|---|---|
| B1 | FeAA | 4400 | 1.38 | Not detected | Transparent | Negative |
| B2 | FeTFPD | 4500 | 1.38 | Not detected | Transparent | Negative |
| B3 | FeAA | 6100 | 1.41 | 0.7 | Transparent | Negative |
| B4 | FeAA | 6400 | 1.44 | 1.2 | Transparent | Negative |
| B5 | FeBzAc | 6600 | 1.45 | 1.0 | Transparent | Negative |
| B6 | FeAA | 6200 | 1.44 | 1.0 | Transparent | Negative |
| B7 | FeAA | 8600 | 1.80 | 1.8 | Transparent | Negative |
| B8 | FeAA | 14500 | 1.88 | 1.0 | Transparent | Negative |
| B9 | FeAA | 4100 | 1.47 | Not detected | Transparent | Not tested |
| Comp. B1 | ZnAA | 7900 | 1.90 | 4.4 | Transparent | Not tested |
| Comp. B2 | CuAA | 7700 | 1.70 | 4.0 | Transparent | Not tested |
| Comp. B3 | BSnL | 6200 | 1.43 | 4.7 | Transparent | Positive |
| Comp. B4 | TEA | 10900 | 2.10 | 10.9 | Transparent | Negative |

As mentioned above, a urethane compound was obtained by all catalysts respectively, but, by a metal diketonate catalyst other than an iron diketonate catalyst, the molecular weight was difficult to be controlled and a large amount of sub-products was provided while the safety was not cleared. In addition, by an amine catalyst, the safety was high, but the molecular weight was difficult to be controlled, and a large amount of sub-products was provided. Therefore, only by (C) Production of Ocular Lens Ocular lenses were produced as follows by using the above-mentioned urethane compounds. Hereinafter, "% by weight" is referred to as "%".

EXAMPLE C1

(Production of Oxygen Permeable Hard Lens)

Ten % of the urethane compound produced in Example B1, 40% of tris(trimethylsiloxy)silylpropylmethacrylate (TRIS), 10% of trifluoromethylmethacrylate (TFMA), 20% of methylmethacrylate (MMA), 10% of ethylene glycol dimethacrylate (EDMA), and 0.20% of 2,2-azobis-(2,4-dimethylvaleronitorile) (V-65) were mixed to provide a mixture solution. The mixture solution was filtrated, and freeze-degassed. A test tube made of glass and having the diameter of 13 mm and the length of 500 mm was charged with the mixture solution and tightly stoppered. The test tube was heated at 35° C. to 110° C. to cure the mixture solution providing a polymer rod. An ocular lens was obtained by machining the obtained polymer rod.

EXAMPLE C2

(Production of Oxygen Permeable Hard Lens)

Ten % of the urethane compound produced in Example B3, 50% of tris(trimethylsiloxy)silylstyrene (SiSt), 10% of TFMA, 20% of MMA, 10% of vinylbenzylmethacrylate (VBMA), and 0.20% of V-65 were mixed to provide a mixture solution. The mixture solution was filtrated, and freeze-degassed. A test tube made of glass with the diameter of 13 mm and the length of 500 mm was charged with the mixture solution and tightly stoppered. The test tube was heated at 35° C. to 110° C. to cure the mixture solution and to provide a polymer rod. An ocular lens was obtained by maching the obtained polymer rod.

EXAMPLE C3

(Production of Oxygen Permeable Hard Lens)

Twenty % of the urethane compound produced in Example B7, 70% of MMA, 10% of EDMA, and 0.20% of V-65 were mixed to provide a mixture solution. The mixture solution was filtrated, and freeze-degassed. A test tube made of glass with the diameter of 13 mm and the length of 500 mm was charged with the mixture solution and tightly stoppered. The test tube was heated at 35° C. to 110° C. to cure the mixture solution and to provide a polymer rod. An ocular lens was obtained by machining the obtained polymer rod.

EXAMPLE C4

(Production of Oxygen Permeable Soft Lens)

Forty % of the urethane compound produced in Example B1, 40% of DMA, 20% of MMA, and 0.20% of V-65 were mixed to provide a mixture solution. The mixture solution was filtrated, and freeze-degassed. A test tube made of glass with the diameter of 13 mm and the length of 500 mm was charged with the mixture solution and tightly stoppered. The test tube was heated at 35° C. to 110° C. to cure the mixture solution and to provide a polymer rod. The polymer rod was machined to form lens shape and immersed in saline and autoclaved at 121° C. for 20 minutes to provide an ocular lens.

EXAMPLE C5

(Production of Oxygen Permeable Soft Lens)

Sixty % of the urethane compound produced in Example B3, 40% of DMA, 0.1% of 2-hydroxy-2-methyl-1-phenylpropane-1-on, 0.5% pf EDMAand 0.02% tetra-(4-methacrylamide) copper phthalocyanine (APMA) were mixed to provide a mixture solution. The mixture solution was filtrated, and freeze-degassed. A lens mold made of polypropylene was charged with the mixture solution. The mixture solution was irradiated with UV light of 10 mW/cm$^2$ and 365 nm for 30 minutes to be cured and to provide a lens. The lens was extracted in 2-propanol, and then treated with an autoclave to provide an ocular lens after 2-propanol was replaced with saline.

EXAMPLE C6

(Production of Oxygen Permeable Soft Lens)

An ocular lens was obtained in the same procedure as that of Example C5 except that 50% of the urethane compound obtained in Example B3, 20% of TRIS, 30% of DMA, 0.1% of 2,4,6-trimethylbenzoyl-diphenylphosphine oxide (TPO), 0.1%-of 2-(5-chloro-2H-benzotriazol-2-yl)-6-(1,1-dimethylethyl)-4-methylphenol (CBDMP), 0.5% of EDMA and 0.02% of APMA were used as components for the mixture solution, and a lamp for UV light of 7.5 mW/cm$^2$ (405 nm) was used.

EXAMPLE C7

(Production of Oxygen Permeable Soft Lens)

An ocular lens was obtained in the same procedure as that of Example C6 except that 30% of the urethane compound obtained in Example B3, 30% of TRIS, 20% of N-vinyl-2-pyrrolidone (NVP), 20% of DMA, 0.1% of TPO, 0.1% of CBDMP, 0.5% of EDMA and 0.02% of APMA were used as components for the mixture solution.

EXAMPLE C8

(Production of Oxygen Permeable Soft Lens)

An ocular lens was obtained in the same procedure as that of Example C6 except that 25% of the urethane compound obtained in Example B3, 25% of TRIS, 25% of N-methyl-3-methylene-2-pyrrolidone (MMP), 25% of DMA, 0.1% of TPO, 0.1% of 1-(4,6-diphenyl-1,3,5-triazine-2-yl)-5-(hexyloxy)phenol(DPTHP), 0.1% of EDMA and 0.02% of APMA were used as components for the mixture solution.

EXAMPLE C9

(Production of Oxygen Permeable Soft Lens)

An ocular lens was obtained in the same procedure as that of Example C6 except that 25% of the urethane compound obtained in Example B3, 25% of TRIS, 25% of NVP, 25% of acryloylmorpholine (ACMO), 0.1% of TPO, 0.1% of DPTHP, and 0.02% of APMA were used as components for the mixture solution.

EXAMPLE C10

(Production of Oxygen Permeable Soft Lens)

An ocular lens was obtained in the same procedure as that of Example C6 except that 70% of the urethane compound obtained in Experiment B7, 30% of DMA, 0.1% of TPO, 0.1% of CBDMP, 0.5% of EDMA and 0.02% of APMA were used as components for the mixture solution.

EXAMPLE C11

(Production of Oxygen Permeable Soft Lens)

An ocular lens was obtained in the same procedure as that of Example C5 except that 90% of the urethane compound obtained in Example B8, 10% of 1,3-bis(3- ethyloxetanylmethoxypropyl)disiloxane, and 2.0% of a boron-based cationic catalyst (a solution of 20% of ethanol/tetraarylboron salt in 2-propanol) were used as components for the mixture solution.

Various measurements were carried out in accordance with the following methods, respectively.

(I) Evaluation of Transparency

The test sample was observed with naked eye.

(II) NMR Analysis

The reactions were examined by NMR analysis on the reaction intermediates, the crude products, and the purified products under the same conditions as in EXAMPLE A1.

(III) FT/IR Analysis

Chemical structures were identified by FT/IR analysis on the crude products and purified products under the same conditions as in EXAMPLE 1.

(IV) SEC Analysis

A molecular weight and a molecular weight distribution were measured on the crude products and the purified products under the same conditions as in EXAMPLE. Low molecular weight compounds were detected from chromatograms.

(V) GC/MS Analysis

Chemical structures were analyzed under the following conditions.

Analyzer: G1800 made by Hewlett Packard

Column: HP-1 made by Hewlett Packard

Conditions: Injection temperature of 320° C., Oven temperature of 50 to 300° C. (20° C./min), Detector temperature of 280° C., Sprit ratio of 50/1

(VI) Biological Safety Test: Cytotoxicity Test (Colony Assay)

The test was carried out in accordance with "the guideline of Basic biological test of medical instruments and medical materials" (MEDICAL DEVICES DIVISION PHARMACEUTICAL AFFAIRS BUREAU Notification No. 99, 1995, published on Jun. 27, 1995 in Japan).

(VII) Quantitative Analysis of Metal by an (Atomic) Absorptimetry

The extract with octane from the solution which was mixed with the urethane compound and acids and heated was measured by GF atomic absorption spectrometer. Concentrations were calculated from the obtained absorbances and a calibration curve.

What is claimed is:

1. A process for preparing an ocular lens with a urethane compound comprising the steps of
a) preparing a urethane compound by reacting at least one hydroxyl compound and at least one isocyanate compound in the presence of an organic iron compound,
b) removing the organic iron compound from the urethane compound obtained in the step a)
c) mixing the urethane compound obtained in the step b) with at least one compound selected from the group consisting of another copolymerizable compound, a crosslinking agent, a UV absorbent, a dye, a polymerization initiator, a photosensitizer, and an organic solvent to obtain a mixture, and
d) curing the mixture obtained in the step c) to prepare a lens.

2. The process for preparing an ocular lens of claim 1 wherein the organic iron compound is represented by the following formula (I)

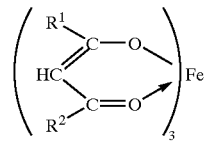

in which each of $R^1$ and $R^2$ is independently selected from the group consisting of methyl group, trifluoromethyl group and phenyl group.

3. The process for preparing an ocular lens of claim 1 wherein the organic iron compound is removed by using an organic solvent or a supercritical fluid.

4. The process for preparing an ocular lens of claim 1 wherein the urethane compound obtained in the step b) has a radical polymerizable ethylenic unsaturated group or a photo cationic crosslinkable functional group.

5. The process for preparing an ocular lens of claim 1 wherein at least one of the hydroxyl compound or at least one of the isocyanate compound has a siloxane structure having a repetition number of 1 to 1500.

6. The process for preparing an ocular lens of claim 1 wherein at least one of the hydroxyl compound or at least one of the isocyanate compound has a perfluoropolyether structure having a repetition number of 1 to 1500.

7. The process for preparing an ocular lens of claim 1 wherein at least one of the hydroxyl compound or at least one of the isocyanate compound has a hydrophilic polymer structure having a molecular weight of 100 to 1000000.

8. The process for preparing an ocular lens of claim 7 wherein the hydrophilic polymer structure has at least one structure obtained by polymerizing a monomer having a zwitterionic group such as poly(2-methacryloyloxyethylphosphorylcholine).

9. The process for preparing an ocular lens of claim 7 wherein the hydrophilic polymer structure consists of at least one compound selected from the group consisting of polyethylene glycol, polypropylene glycol, polyvinylalcohol, polyvinylpyrrolidone, poly(meth)acrylic acid, a salt of poly(meth)acrylic acid, poly 2-hydroxyethyl (meth)acrylate, polytetrahydrofuran, polyoxetane, polyoxazoline, polydimethylacrylamide, and polydiethylacrylamide.

10. A process for preparing a urethane compound for medical instruments, characterized by
reacting a hydroxyl compound with an isocyanate compound in the presence of an organic iron compound represented by the formula (I)

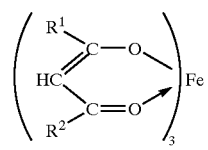

in which each of $R^1$ and $R^2$ is independently selected from the group consisting of methyl group, trifluoromethyl group and phenyl group, as a reaction catalyst to give a urethane compound.

* * * * *